United States Patent
Kuroda

(10) Patent No.: US 8,376,647 B2
(45) Date of Patent: Feb. 19, 2013

(54) BALL JOINT AND PRODUCTION METHOD THEREFOR

(75) Inventor: Shigeru Kuroda, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 66 days.

(21) Appl. No.: 12/935,990

(22) PCT Filed: Apr. 15, 2009

(86) PCT No.: PCT/JP2009/057577
§ 371 (c)(1),
(2), (4) Date: Oct. 1, 2010

(87) PCT Pub. No.: WO2009/128472
PCT Pub. Date: Oct. 22, 2009

(65) Prior Publication Data
US 2011/0033226 A1 Feb. 10, 2011

(30) Foreign Application Priority Data
Apr. 18, 2008 (JP) .................................. 2008-108675

(51) Int. Cl.
*F16C 11/00* (2006.01)
(52) U.S. Cl. ...................................................... 403/134
(58) Field of Classification Search .................... 403/50, 403/122, 134, 76, 383; 29/441.7, 527.1
See application file for complete search history.

(56) References Cited

U.S. PATENT DOCUMENTS

| 2,589,820 | A | * | 3/1952 | Konchan | 403/75 |
| 4,225,261 | A | * | 9/1980 | Marx | 403/122 |
| 4,311,405 | A | | 1/1982 | Hawley | |
| 4,367,968 | A | * | 1/1983 | Ishida | 403/122 |
| 5,009,538 | A | * | 4/1991 | Shirai et al. | 403/134 |
| 5,092,703 | A | | 3/1992 | Kobayashi | |
| 5,277,860 | A | * | 1/1994 | Sinclair | 264/242 |
| 5,352,059 | A | | 10/1994 | Ueno et al. | |
| 5,613,792 | A | * | 3/1997 | Terada et al. | 403/131 |
| 5,615,967 | A | * | 4/1997 | Hellon | 403/133 |

(Continued)

FOREIGN PATENT DOCUMENTS
DE 3843330 A1 * 7/1990
JP A-50-78749 6/1975
(Continued)

OTHER PUBLICATIONS

International Search Report for International Patent Application No. PCT/JP2009/057577, mailed on Jul. 28, 2009.

(Continued)

*Primary Examiner* — Michael P Ferguson
*Assistant Examiner* — Daniel Wiley
(74) *Attorney, Agent, or Firm* — Oliff & Berridge, PLC

(57) ABSTRACT

A ball joint, which has high reliability and reduced weight, is provided. A ball joint includes: a ball stud having a columnar stud portion and a ball portion which has a spherical side surface and a center positioned on an axis of the stud portion; a ball seat which is made of a resin and has a spherical recess portion into which the ball portion is relatively rotatably and slidably fitted; a housing which is made of a resin and holds the ball seat therein; and a support bar which is integrally formed with the housing, wherein the support bar has a bar portion which is a center portion extending along an axis of the support bar.

5 Claims, 7 Drawing Sheets

U.S. PATENT DOCUMENTS

| | | | |
|---|---|---|---|
| 5,626,433 A * | 5/1997 | Iwamoto | 403/76 |
| 5,947,627 A * | 9/1999 | Uneme et al. | 403/122 |
| 6,161,451 A * | 12/2000 | Gleason, II | 74/579 R |
| 6,164,860 A * | 12/2000 | Kondo | 403/132 |
| 7,134,801 B2 * | 11/2006 | Kuroda | 403/135 |
| 7,520,691 B2 * | 4/2009 | Dearing et al. | 403/135 |
| 7,837,230 B2 * | 11/2010 | Mellis et al. | 280/781 |
| 2002/0146277 A1 * | 10/2002 | Kuroda | 403/135 |
| 2004/0034958 A1 | 2/2004 | Buchanan, Jr. | |
| 2004/0258461 A1 | 12/2004 | Wolf et al. | |
| 2006/0039748 A1 * | 2/2006 | Ruhlander | 403/122 |
| 2006/0150416 A1 | 7/2006 | Michioka et al. | |
| 2009/0001681 A1 * | 1/2009 | Morales Arnaez | 280/124.134 |
| 2011/0150563 A1 * | 6/2011 | Kuroda | 403/122 |

FOREIGN PATENT DOCUMENTS

| | | |
|---|---|---|
| JP | A-56-73218 | 6/1981 |
| JP | U-62-69620 | 5/1987 |
| JP | A-1-126413 | 5/1989 |
| JP | A-3-9113 | 1/1991 |
| JP | A-4-262112 | 9/1992 |
| JP | A-2000-81025 | 3/2000 |
| JP | A-2000-309214 | 11/2000 |
| JP | A-2000-310216 | 11/2000 |
| JP | A-2004-316771 | 11/2004 |
| JP | A-2005-532509 | 10/2005 |

OTHER PUBLICATIONS

Japanese Office Action issued Oct. 25, 2011 in Japanese Patent Application No. 2008-108675 (with partial translation).

Nov. 5, 2012 Office Action issued in Chinese Patent Application No. 200980113613.3 (with translation).

\* cited by examiner

BALL JOINT AND PRODUCTION METHOD THEREFOR

TECHNICAL FIELD

The present invention relates to a ball joint provided to stabilizers of vehicles (automobiles and the like), and to a production method therefor.

BACKGROUND ART

For example, in a suspension mechanism of a vehicle, in order to rotatably and vibratably connect two portions (for example, a stabilizer and a shock absorber, or a stabilizer and a suspension arm) which can move relatively, a ball joint may be used.

This ball joint is equipped with a ball stud, a ball seat, a housing, a support bar, and a dust cover. The ball stud has a stud portion and a ball portion. The ball seat has a bearing function and the ball portion is press-fitted therein. The housing holds the ball seat therein. The support bar supports the housing. The dust cover prevents infiltration of foreign matter which may inhibit sliding and vibration of the ball portion of the ball stud in the ball seat.

In a production method for this ball joint, a housing and a support bar were separately formed, and the support bar, which was made of steel (for example, S200C), was connected to the housing, which was produced by press forming or the like, by resistance welding or carbon dioxide welding.

When the support bar and the like are made of a steel material, the support bar is the heaviest of the components (the ball stud, the dust cover, the support bar, and the ball seat) of one ball joint. For example, the weight of the support bar having an axial direction length of 325 mm is 260 grams, the total weight of the components other than the support bar is 130 grams, and the weight of support bar is two times as heavy as those of the components other than the support bar. That is, the weight (130 grams) of the support bar is two thirds of the weight (390 grams) of the ball joint. Due to this, the weight of the ball joint is heavier, and it is therefore difficult for the ball joint to contribute to the weight reduction of the vehicle.

When the housing and the support bar are separately formed, the support bar is connected to the housing by resistance welding or the like. Thus, when endurance tests were performed in which a tensile load or a compressive load was applied on the support bar in an axial direction thereof, it was confirmed that breakage occurs at a welded portion before a predetermined number of times of conducting the endurance test. Due to this, in a housing and a support bar which are integrally formed, a strength of a connecting portion may be low, and reliability of a ball joint may be insufficient.

For example, Japanese Unexamined Patent Application Publication No. 2004-316771 discloses a production method for ball joints in which a housing and a support bar which are integrally formed by using aluminum or the like. In this production method, first, a resin liner (ball seat) is formed at a ball portion of a ball stud by injection molding. Next, the ball portion and the resin liner are inserted into a die for forming a housing and a support bar as a core. A housing, which covers the resin liner, and a support bar, which supports the housing, are formed by die casting using a zinc alloy or an aluminum alloy. Next, a stud portion is connected to the ball portion.

However, in the technique proposed above, in the die casting, a melted aluminum alloy is supplied to the die using the ball portion of the ball stud and the ball seat as the core, so that an outer surface of the ball seat made of a resin is deteriorated. Due to this, a contact portion of the ball seat which contacts the ball portion is maintained in good condition, but resin thickness thereof has a subtle unevenness. Thus, sliding and vibration of the ball stud may be unstable. That is, when a tensile load or a compressive load is applied on the support bar in an axial direction of the ball stud and in a radial direction of the ball portion, deflection amount of the ball seat may be uneven. Due to this, sliding and vibration of the ball stud may be irregular. As a result, the performance of the ball joint cannot be sufficient, and the ball joint may not be sufficiently reliable.

Since the ball portion of the ball stud and the ball seat are used as the core in the die casting, when the stud portion is connected to the ball portion, die casting cannot be performed for the formation of the housing and the support bar. Due to this, after the die casting for the formation of the housing and the support bar, the stud portion was connected to the ball portion by resistance welding or the like, and the ball stud was thereby formed. Thus, strength of a connecting portion of the ball portion and the stud portion may be low, and reliability of the ball joint may be insufficient.

DISCLOSURE OF THE INVENTION

An object of the present invention is to provide a ball joint which can have high reliability and reduced weight.

According to first aspect of the present invention, a ball joint includes: a ball stud having a columnar stud portion and a ball portion which has a spherical side surface and a center positioned on an axis of the stud portion; a ball seat which is made of a resin and has a spherical recess portion into which the ball portion is relatively rotatably and slidably fitted; a housing which is made of a resin and holds the ball seat therein; and a support bar which is integrally formed with the housing, wherein the support bar has a bar portion which is a center portion extending along an axis of the support bar.

According to second aspect of the present invention, a ball joint includes: a ball stud having a columnar stud portion and a ball portion which has a spherical side surface and a center positioned on an axis of the stud portion; a ball seat which is made of a resin and has a spherical recess portion into which the ball portion is relatively rotatably and slidably fitted; a housing which is made of a resin and holds the ball seat therein; and a support bar which is connected with the housing, wherein the housing has a boss portion having an opening portion which opens at a side surface of the housing, the support bar has a bar portion and a flange portion, the bar portion being a center portion extending along an axis of the support bar, the flange portion formed at a leading end portion of the bar portion so as to have a flanged shape, and the support bar is connected with the boss portion so that the opening portion is formed in close contact with and covers an entire periphery of the flange portion.

In the aspect of the present invention, since the housing and the support bar are integrally formed, when a tensile load, a compressive load, or the like is applied in the axial direction of the support bar, a boundary portion between the housing and the support bar can have the load applied thereto. Since the support bar is connected with the boss portion so that the opening portion is formed in close contact with and covers an entire periphery of the flange portion, when a tensile load, a compressive load, or the like is applied in the axial direction of the support bar, a boundary portion between the housing and the support bar can have the load applied thereto. Thus, when the load is applied in the axial direction of the support bar, breakage from the boundary portion between the housing and the support bar can be prevented. That is, the ability to support the load in the axial direction of the support bar can be improved, and the strength of the ball joint can be improved. As a result, the reliability of the ball joint can be improved. The weight of the ball joint can be reduced. It is unnecessary to consider electrical corrosion occurring when an aluminum alloy is used.

According to a preferred embodiment of the present invention, the resin may be polyphenylene sulfide, polyether ether ketone, or the like. For example, in the material (polyphenylene sulfide, polyether ether ketone, or the like), when injection conditions for formation of the housing and support bar are selected, generation of burr can be prevented. The material (polyphenylene sulfide, polyether ether ketone, or the like) can have a heat resistance and strength so as to resist the heat in caulking of thermal caulking portion of the ball seat.

According to a preferred embodiment of the present invention, the support bar may extend in an axial direction of the support bar and may have plural protruding ridges which are integrally formed with the bar portion in a circumferential direction of the support bar. In this embodiment, when a load is applied in the axial direction of the support bar, buckling of the support bar can be prevented. That is, stiffness of the support bar can be improved. The resin used can be reduced, so that the weight and the cost can be reduced.

According to a preferred embodiment of the present invention, the support bar may have plural protruding portions at the flange portion of the bar portion, and the opening portion may be formed in close contact with and may cover entire peripheries of the protruding portions. In this embodiment, when a torsional load is applied on the housing or the support bar, rotation of the housing or the support bar with respect to each other can be prevented. Thus, when a torsional load is applied on the housing or the support bar, change of the phase angle between the housings can be prevented, and the function of the ball joint can be maintained. The protruding portion of this embodiment can be a line protruding portion, a convex protruding portion, or the like.

According to a preferred embodiment of the present invention, the support bar may have a straight portion formed at a side of the housing and within a predetermined range in an axial direction of the support bar, the axial direction being apart from the boss portion. In this embodiment, when the housing is formed at the leading end portion of the support bar after formation of the support bar, the support bar can be supported by supporting the straight portion, and the housing can be formed. Thus, when the housing is formed, the support bar can be easily supported, so that change of the support position of the support bar can be prevented, and leakage of the resin from the die for forming the housing can be prevented. The straight portion of this embodiment may have a shape so as to easily support the support bar. The straight portion of this embodiment can have a columnar shape, a rectangular columnar shape, or the like.

According to a preferred embodiment of the present invention, the housing may be formed to have an upper end side and a bottom side, the upper end side having an outer diameter larger than that of the bottom side. In this embodiment, the strength of the upper side of the housing having the recess portion which may be weak can be greater. Thus, when a tensile load is applied on the housing toward an axial direction of the support bar, the housing can have the load applied thereto, and breakage of the housing can be prevented. That is, the strength of the housing can be greater. The resin used can be reduced, so that weight and cost can be reduced.

According to a preferred embodiment of the present invention, the ball joint may include: a dust cover which has an end contacting the stud portion and the other end contacting an upper end of the housing; an upper end portion which is formed at the upper end of the housing so as to have a flat contact portion which the dust cover contacts when the ball stud vibrates; and a flat portion which is formed at a side of the support bar so as to be flush with the upper end portion. In this embodiment, the entire portion, which the dust cover contacts in vibration of the ball stud, can be flat. Thus, in vibration of the ball stud, contact of the dust cover to a protruding portion (a corner portion or the like) can be prevented, and breakage of the dust cover can be prevented.

According to another aspect of the present invention, a production method for a ball joint includes: injection molding in which a support bar having a flange portion having a flanged shape and a straight portion is formed by injection using a resin; and insert molding in which the straight portion is supported and a housing having a boss portion is formed by injection using a resin so that the boss portion covers a leading end portion of the support bar which includes the flange portion.

In the aspect of the present invention, when the housing is formed at the leading end portion of the support bar, the straight portion is supported, and the housing is formed. Thus, the support bar can be easily supported, so that change of the relative position of the support bar to the die for forming the housing can be prevented. Therefore, leakage of the resin from the die for forming the housing can be prevented. The end portion of the support bar can be strongly compressed and secured by molding shrinkage of the housing formed after the formation of the support bar. Thus, generation of backlash, in which contact surfaces of the housing and the support bar may be separated from each other, can be prevented, so that the reliability of the ball joint can be improved.

According to the present invention, a ball joint, which has high reliability and reduced weight, can be produced.

EXPLANATION OF REFERENCE NUMERALS

Figure 1:
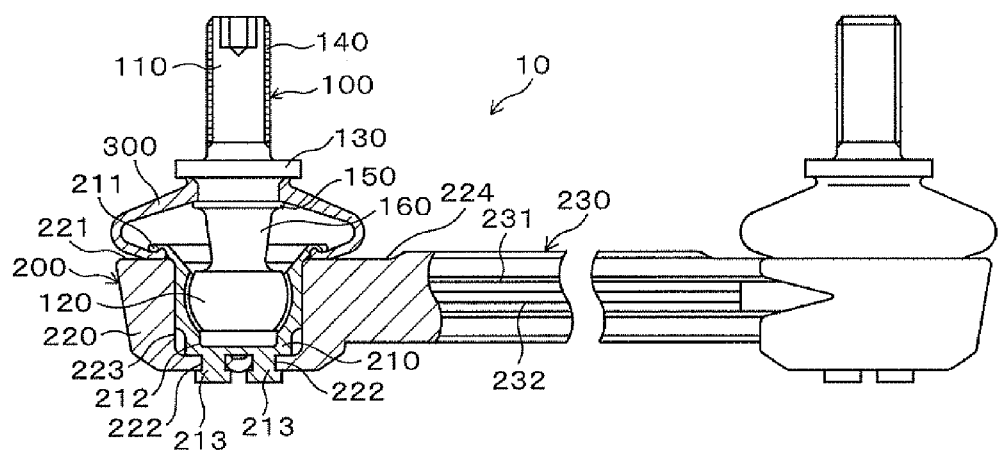
FIG. 1 is a diagram which shows a ball joint.

Reference numeral 10 denotes a ball joint, 100 denotes a ball stud, 110 denotes a stud portion, 120 denotes a ball portion, 210 denotes a ball seat, 212 denotes a recess portion, 220 denotes a housing, 221 denotes an upper portion, 223 denotes a recess portion, 224 denotes a flat portion, 230 denotes a support bar, 231 denotes a bar portion, 232 denotes a protruding ridge, 300 denotes a dust cover, 525 denotes a boss portion, 525a denotes an opening portion, 533 denotes a straight portion, 534 denotes a protruding portion, 535 denotes a flange portion.

BEST MODE FOR CARRYING OUT THE INVENTION

1. First Embodiment

Construction of Ball Joint of First Embodiment

Figure 2:
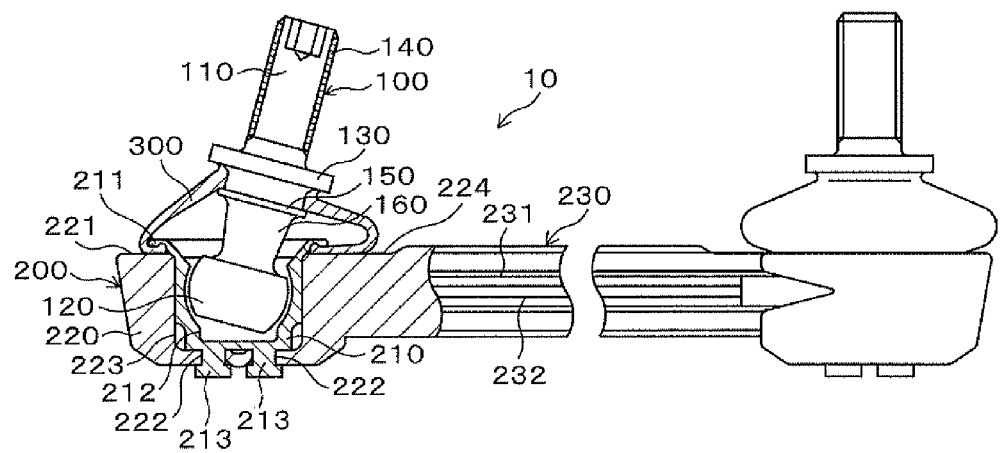
FIG. 2 is a diagram showing a condition in which a ball joint is vibrated.
Figure 3:
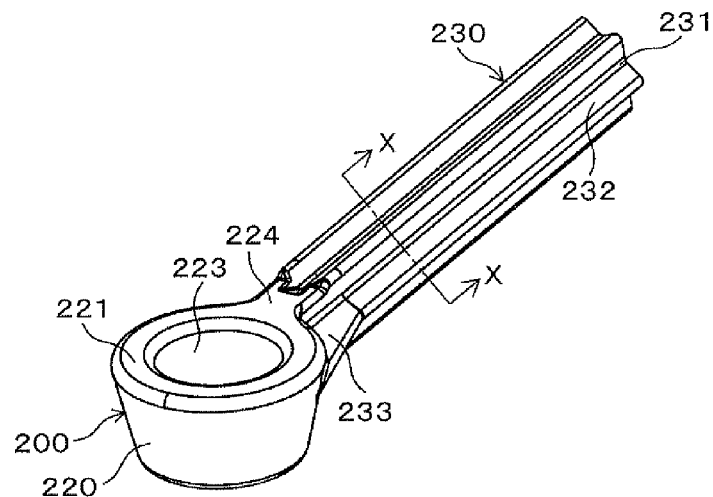
FIG. 3 is a perspective view showing a portion of a pivot member.
Figure 4:
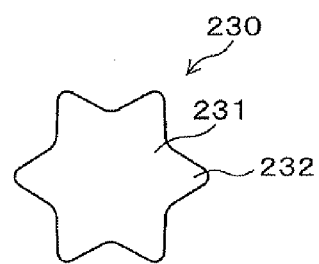
FIG. 4 is a cross sectional view which is taken along line X-X in FIG. 3 and which shows a support bar.
Figure 5:
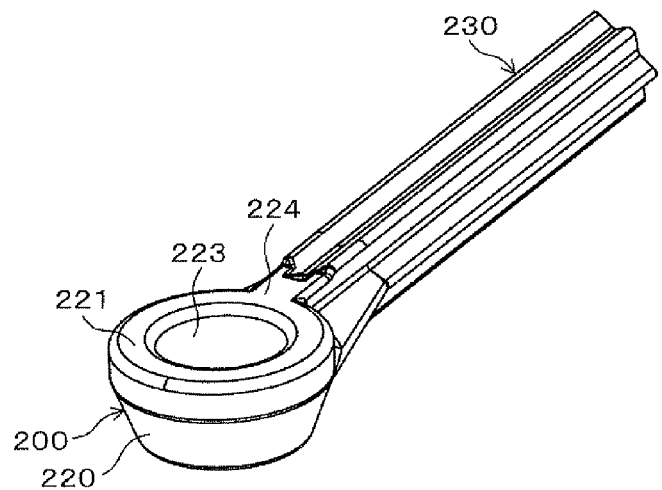
FIG. 5 is a perspective view which shows a first modification example of a pivot member.
Figure 6:
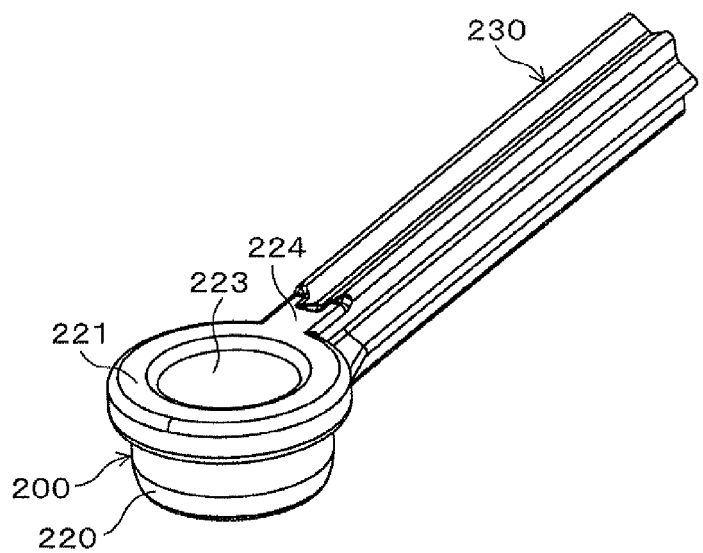
FIG. 6 is a perspective view showing a second modification example of a pivot member.
Figure 7:
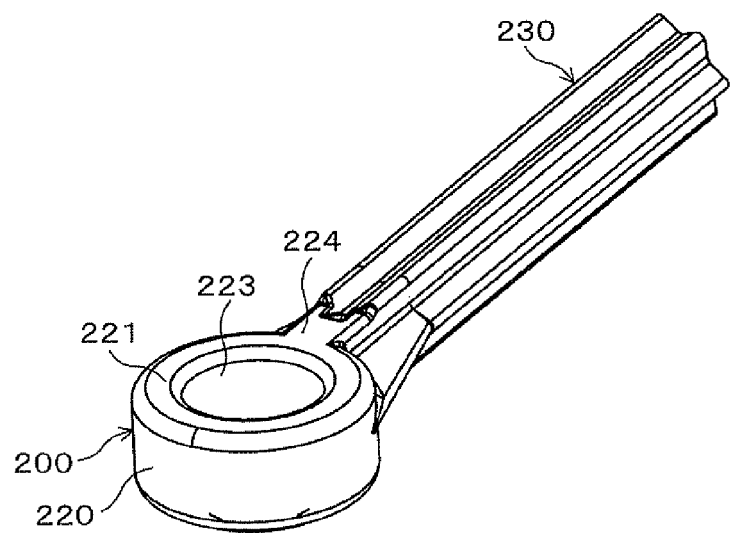
FIG. 7 is a perspective view showing a third modification example of a pivot member.
Figure 8A:
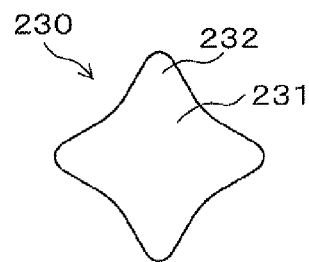
FIGS. 8A and 8B are cross sectional views showing a modification example of a support bar.
Figure 8B:
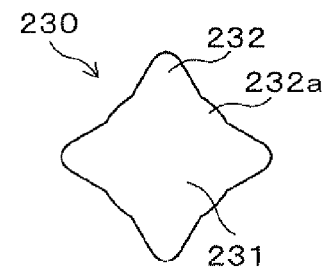

An embodiment of the present invention will be explained hereinafter. FIG. 1 is a diagram which shows a ball joint. FIG. 2 is a diagram showing a condition in which a ball joint is vibrated. FIG. 3 is a perspective view showing a portion of a pivot member. FIG. 4 is a cross sectional view which is taken along line X-X in FIG. 3 and which shows a support bar. FIG. 5 is a perspective view showing a first modification example of a pivot member. FIG. 6 is a perspective view showing a second modification example of a pivot member. FIG. 7 is a perspective view showing a third modification example of a pivot member. FIGS. 8A and 8B are cross sectional views showing a modification example of a support bar. FIG. 8A is a cross sectional view showing a first modification example of a support bar. FIG. 8B is a cross sectional view showing a second modification example of a support bar.

As shown in FIGS. 1 and 2, a ball joint 10 is equipped with a ball stud 100, a pivot member 200, a dust cover 300, and the like. The pivot member 200 has a housing 220 and the like. The ball joint 10 has the ball stud 100 and the pivot member 200 as main components, and it is secured to a plate-like mounting member (not shown in the Figures). The pivot member 200 universally supports the ball stud 100. The ball joint 10 is used for connecting portions of stabilizers or the like.

As shown in FIGS. 1 and 2, housings 220 are provided on both sides of a support bar 230. In a connecting portion of a stabilizer, when mounting directions of the housings 220 are the same, a phase angle between the housings 220 is 0 degrees. Thus, as shown in FIGS. 1 and 2, when the housings 220 on both sides are directed toward an upper side, the phase angle between the housings 220 is 0 degrees. When the housing 220 on one side is directed toward an upper side and the other housing 220 on the other side is directed toward a lower side, the phase angle between the housings 220 is 180 degrees.

The ball stud 100 is made of a metal and is integrally formed. As shown in FIGS. 1 and 2, the ball stud 100 has a stud portion 110, a ball portion 120, a flange portion 130, a screw portion 140, a protruding portion 150, and a tapered portion 160. The ball stud 100 is structured such that the ball portion 120 is formed at an end portion of the columnar stud portion 110. The ball portion 120 has a center positioned on an axis of the stud portion 110. On the ball stud 100, the flange portion 130 having a flanged shape is formed at an axial direction middle portion of the stud portion 110, and the protruding portion 150 is formed for prevention of movement of the dust cover 300. On the ball stud 100, at a circumferential surface of a leading end side from the flange portion 130 of the stud portion 110 (that is, a peripheral surface of a side opposite to the ball portion 120), the screw portion 140 is formed, and the tapered portion 160 is formed at a side of the ball portion 120.

The ball stud 100 is fastened as follows. The leading end portion of the ball stud 100, at which the screw portion 140 is formed, is penetrated into a hole which is formed at the mounting member (not shown in the Figures). A nut (not shown in the Figures) is screwed to the screw portion 140, so that the leading end portion of the ball stud 100 is secured to the mounting member. Thus, the flange portion 130 of the ball stud 100 and the nut hold the mounting member, so that the ball stud 100 is fastened.

As shown in FIGS. 1 and 2, the pivot member 200 is equipped with a ball seat 210, the housing 220, and the support bar 230.

The ball seat 210 is made of a hard resin (polyacetal, polybutylene terephthalate, or the like). The ball seat 210 has a flange portion 211, a recess portion 212, and a thermal caulking portion 213. The ball seat 210 has a cylindrical shape with a bottom. The flange portion 211 is formed at an upper end of the cylindrical shape. Regarding the ball seat 210, the spherical recess portion 212 is formed at an inner portion thereof, and the thermal caulking portion 213 is formed at an outside bottom surface thereof for securing the ball seat 210 to the housing 220.

The housing 220 is made of a resin (polyphenylene sulfide, polyether ether ketone, or the like). The housing 220 has an upper end portion 221, a hole portion 222, a recess portion 223, and a flat portion 224. The upper end portion 221 and the flat portion 224 are formed at an upper end of the housing 220. The recess portion 223 in which the ball seat 210 is provided is formed at an inner portion of the housing 220. The hole portion 222, in which the thermal caulking portion 213 of the ball seat 210 is inserted, is at a bottom surface of the housing 220. The housing 220 holds the ball seat 210 therein. Specifically, the thermal caulking portion 213 of the ball seat 210, which is fitted into the hole portion 222, is heated, so that the ball seat 210 is secured to the housing 220.

The housing 220 is formed so as to have an outer diameter at the upper end side which is larger than an outer diameter of the bottom side. Specifically, the entirety of the peripheral wall of the housing 220 is formed so as to have a tapered shape, and the outer diameter of the housing 220 is slightly larger from the bottom side to the upper end side of the housing 220.

An embodiment in which the outer diameter of the housing 220 is larger at the upper end side is not limited to this embodiment. For example, as shown in FIG. 5, a portion of the peripheral wall may be formed so as to have a tapered shape. Alternatively, as shown in FIG. 6, a flange portion may be provided at the upper end side of the housing 220. Alternatively, as shown in FIG. 7, the housing 220 may have a cylindrical shape.

Since the housing 220 is formed so as to have an outer diameter of the upper end side which is larger than an outer diameter of the bottom side in this manner, the strength of the upper side of the housing 220, which may be weak, can be greater. Thus, when a tensile load is applied on the housing 220 toward an axial direction of the support bar 230, the housing 220 can have the load applied thereto, and breakage of the housing 220 can be prevented. That is, the strength of the housing 220 can be greater. The resin used can be reduced, so that weight and cost can be reduced.

As shown in FIGS. 1 to 3, the flat portion 224 is provided at the upper end of the housing 220 which is proximate to the support bar 230. The flat portion 224 is provided to be flush with the upper end portion 221. The upper end portion 221 is formed so as to have a flat contact portion which the dust cover 300 contacts in vibration of the ball stud 100.

The entire portion, which the dust cover 300 contacts in vibration of the ball stud 100, is flat by formation of the flat portion 224 and the upper end portion 221. Thus, in vibration of the ball stud 100, contact of the dust cover 300 to a protruding portion (a corner portion or the like) can be prevented, and breakage of the dust cover 300 can be prevented.

The support bar 230 is made of a resin (polyphenylene sulfide, polyether ether ketone, or the like). The support bar 230 is integrally formed with the housing 220. The support bar 230 is provided at the peripheral wall of the housing 220 so as to extend in a radial direction of the housing 220. As shown in FIGS. 1 to 3, the support bar 230 has a bar portion 231, a protruding ridge 232, and a support portion 233. The bar portion 231 is a center portion extending in the axial direction of the support bar 230.

In consideration of a die for forming the housing 220 and the support bar 230, when the phase angle is 0 degrees or 180 degrees, the embodiment in which the housing 220 and the support bar 230 are integrally formed is desirable.

Since the housing 220 and the support bar 230 are integrally formed in this manner, when a tensile load, a compressive load, or the like is applied in the axial direction of the support bar 230, a boundary portion between the housing 220 and the support bar 230 has the load applied thereto. Thus, when the load is applied in the axial direction of the support bar 230, breakage from the boundary portion between the housing 220 and the support bar 230 can be prevented. That is, the ability to support the load in the axial direction of the support bar 230 can be improved, and the strength of the ball joint 10 can be improved. As a result, the reliability of the ball joint 10 can be improved.

The protruding ridges 232 are provided so as to extend in the axial direction of the support bar 230. The protruding ridges 232 are integrally formed with the bar portion 231. Plural protruding ridges 232 are provided in a circumferential direction. For example, as shown in FIG. 4, the number of protruding ridges 232 is six. Since the phase angle between the housings 220 on both ends of the support bar 230 is 0 degrees or 180 degrees, a pair of the protruding ridges 232 is provided so that each faces the other in a horizontal direction when opening directions of the recesses 223 of the housings 220 are upward and downward.

The present invention is not limited to the embodiment in which the number of the protruding ridges 232 is six. For example, as shown in FIGS. 8A and 8B, the number of the protruding ridges 232 may be four. The present invention is not limited to having a valley formed between the protruding ridges 232 and 232 as shown in FIG. 8A. For example, as shown in FIG. 8B, a protruding portion 232a may be formed between the protruding ridges 232 and 232.

For example, the number of the protruding ridges may be eight. In this case, in consideration of easy removal of the support bar from a half divided die, there may be one of eight protruding ridges, which may be an overhang portion that abuts the half divided die and cannot be easily removed therefrom. In this case, the protruding ridge which may be the overhang portion is formed so as to be smaller than the other protruding ridges which may not be an overhang portion. Therefore, the protruding ridge may not function as the overhang portion. Thus, the number of the protruding ridges is not limited to even number, and it may be odd number. The number of the protruding ridges may be plural.

In this manner, since the protruding ridges 232 are provided so as to extend, buckling of the support bar 230 can be prevented when a load is applied in the axial direction of the support bar 230. That is, stiffness of the support bar 230 can be improved. The resin used can be reduced, so that the weight and the cost can be reduced.

As shown in FIG. 3, the support portions 233 are provided at both sides of the bar portion 231 which is proximate to the housing 220. The support portions 233 are formed so as to have an inner shape formed by drawing a tangential line from the peripheral wall of the housing 220 in the horizontal direction. Specifically, a pair of the protruding ridges 232 positioned horizontally is formed so as to extend the width thereof. When a load is applied on the housing 220 or the support bar 230 from the horizontal direction, the support portions 233 support the housing 220 or the support bar 230. Thus, breakage, which may occur from the boundary portion between the housing 220 and the support bar 230 due to the load, can be prevented.

The shape of the support portion 233 is not limited to that of this embodiment. For example, the shape of the support portion 233 may be formed such that a tangential line drawn from the peripheral wall of the housing 220 is formed to have a circular arc shape. The support portion 233 may have a shape so as to support the housing 220 or the support bar 230 when a load is applied on the housing 220 or the support bar 230 from the horizontal direction.

As shown in FIGS. 1 and 2, the dust cover 300 is made of a rubber and has an umbrella shape. The dust cover 300 is secured as follows. The larger diameter side end of the dust cover 300 is held by the flange portion 211 of the ball seat 210 and the upper end portion 221 of the housing 220, thereby being secured therebetween. The smaller diameter side end of the dust cover 300 is latched by the flange portion 130 of the ball stud 100 and movement of the smaller diameter side end thereof is inhibited by the protruding portion 150, so that the smaller diameter side end thereof is secured thereat. Thus, sealing properties can be provided by the dust cover 300, and infiltration of dust into the recess portion 212 of the ball seat 210 can be prevented. As shown in FIG. 2, the dust cover 300 contacts the upper end portion 221 and the flat portion 224 in vibration of the ball stud 100.

Regarding the weight of the ball joint 10, for example, one ball joint having a housing and a support bar which are made of a steel material has a weight of 390 grams. When the support bar 230 has an axial direction length of 325 mm, the weight of the support bar 230 is 105 grams, and the total weight of the support bar 230 is 235 grams. Thus, the weight can be reduced by about 155 grams.

Production Method for Ball Joint of First Embodiment

Figure 9:
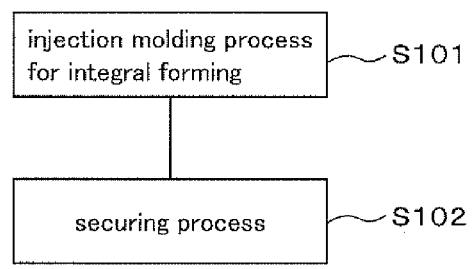
FIG. 9 is a flow chart which shows a production method for a ball joint.

Next, a production method for the ball joint 10 of the first embodiment will be explained with reference to the drawings. FIG. 9 is a flow chart which shows a production method for a ball joint.

First, in an injection molding process (in step S101), the housing 220, having the hole portion 222 and the recess portion 223, and the support bar 230 are integrally formed by injection using a resin. Next, in a securing process (in step S102), the ball seat 210 is inserted into the recess portion 223 of the housing 220. In the securing process, in a condition in which the ball portion 120 of the ball stud 100 is press-fitted into the recess portion 212 of the ball seat 210, the ball seat 210 is press-fitted into the recess portion 223 of the housing 220. In a thermal caulking process, the thermal caulking portion 213, which is provided at the bottom surface of the ball seat 210 inserted into the hole portion 222 formed in the bottom surface of the housing 220, is caulked by heating. The ball joint 10 is produced by the above processes.

The securing process, in which the ball seat is secured in the recess portion 223 of the housing 220, is not limited to the embodiment. For example, an adhesive layer may be provided at the recess portion of the housing, and the ball seat may be secured in the recess portion of the housing.

In this production method, in consideration of bending of the support bar 230, by adjusting a shape of a die for the injection molding process, it is possible for an outer diameter of the support bar 230 to be slightly smaller from a center of the support bar 230, which is a maximum stress portion, to an end portion thereof. Thus, stress of the bar portion 231 cam be uniform, and the weight of the ball joint 10 can be further reduced.

In the ball joint produced by this production method, the housing 220 and the support bar 230 are integrally formed, when a tensile load, a compressive load, or the like is applied in the axial direction of the support bar 230, a boundary portion between the housing 220 and the support bar 230 has the load applied thereto. Thus, when the load is applied in the axial direction of the support bar 230, breakage from the boundary portion between the housing 220 and the support bar 230 can be prevented. That is, the ability to support the load in the axial direction of the support bar 230 can be improved, and the strength of the ball joint 10 can be improved. As a result, the reliability of the ball joint 10 can be improved. The weight of the ball joint can be reduced.

2. Second Embodiment

Construction of Pivot Member of Second Embodiment

A second embodiment of the ball joint of the present invention will be explained with reference to the drawings. In the second embodiment of the ball joint, the housing and the support bar of the pivot member of the first embodiment are modified. Thus, constructions of the housing and the support bar of the pivot member will be explained mainly, and explanation of the same components as those in the first embodiment will be omitted.

Figure 10:
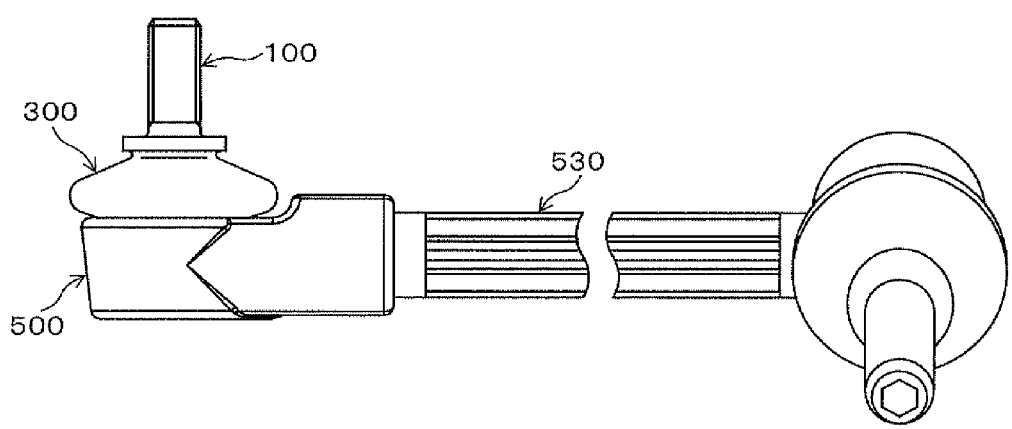
FIG. 10 is a diagram which shows a ball joint according to a second embodiment.
Figure 11A:
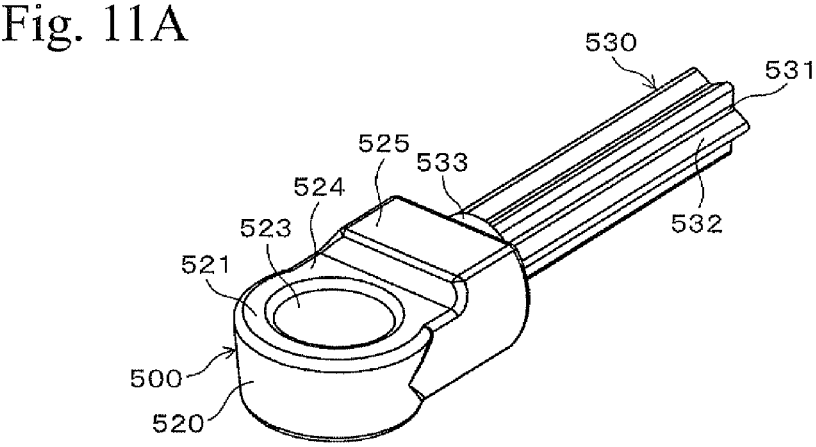
FIGS. 11A and 11B are views showing a portion of a pivot member according to a second embodiment.
Figure 11B:
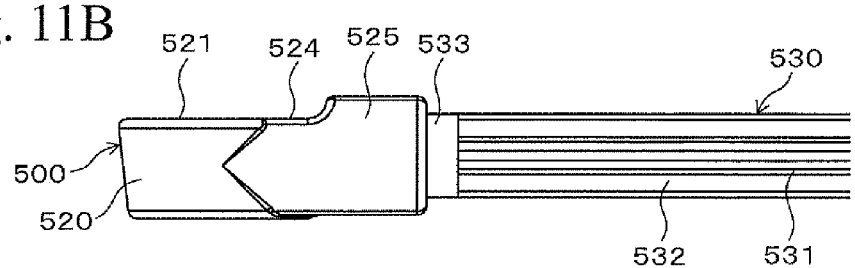
Figure 12A:
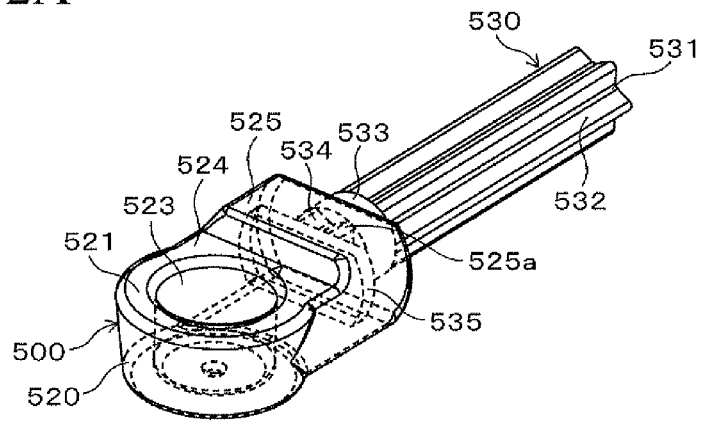
FIGS. 12A and 12B are views showing a portion of a pivot member according to a second embodiment.
Figure 12B:
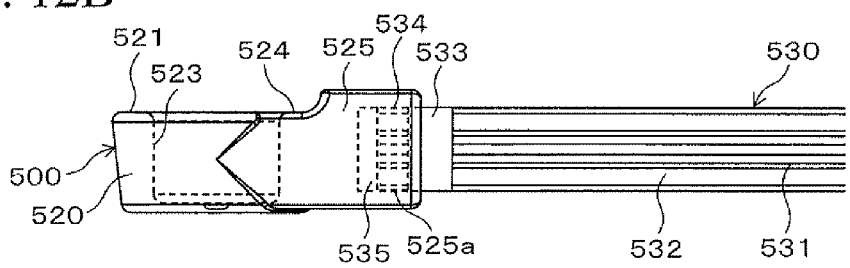
Figure 13A:
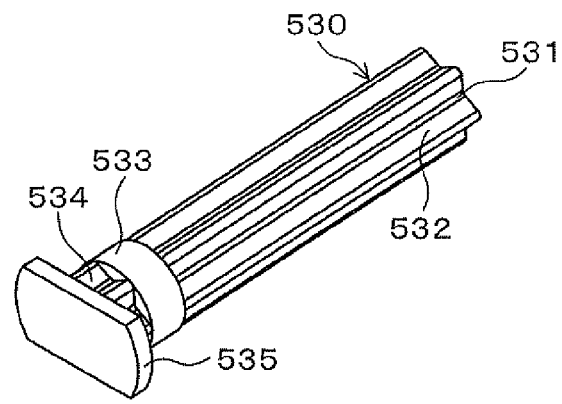
FIGS. 13A to 13C are diagrams showing a support bar according to a second embodiment.
Figure 13B:
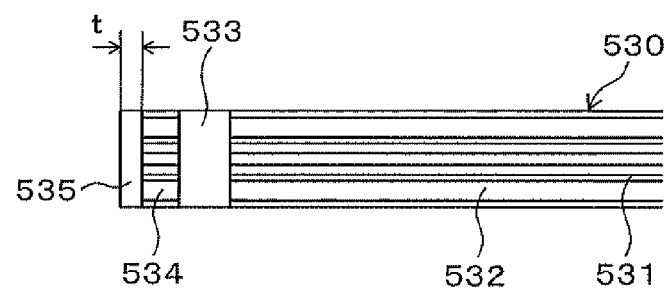
Figure 13C:
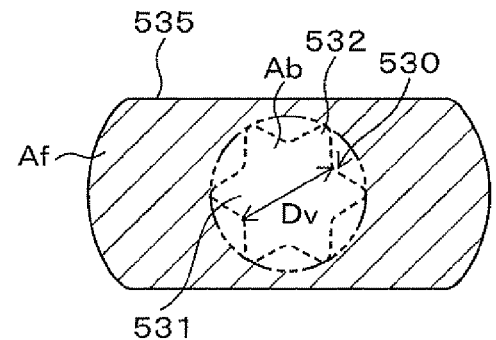

FIG. 10 is a diagram which shows a ball joint according to a second embodiment. FIGS. 11A and 11B are views showing a portion of a pivot member according to a second embodiment. FIG. 11A is a perspective view of the portion of the pivot member. FIG. 11B is a side view of the portion of the pivot member. FIGS. 12A and 12B are views showing a portion of a pivot member according to a second embodiment. FIG. 12A is a perspective view of the portion of the pivot member. FIG. 12B is a side view of the portion of the pivot member. FIGS. 13A to 13C are diagrams showing a support bar according to a second embodiment. FIG. 13A is a perspective view of the support bar. FIG. 13B is a side view of the support bar. FIG. 13C is a conceptual diagram of the support bar.

The housing 520 is made of a resin (polyphenylene sulfide, polyether ether ketone, or the like). As shown in FIGS. 11A and 11B and 12A and 12B, the housing 520 has an upper portion 521, a recess portion 523, a flat portion 524, and a boss portion 525.

The boss portion 525 is provided at a side of the support bar 530. The boss portion 525 has an opening portion 525a. The opening portion 525a opens at a side surface of the housing 520. A leading end portion of the support bar 530 is connected to the opening portion 525a, and the boss portion 525 is a portion for connecting the housing 520 and a support bar 530.

The opening portion 525a covers the leading end portion of the support bar 530, and has the same shape as that of he leading end portion of the support bar 530.

The boss portion 525 is formed so as to closely contact and cover the leading end portion of the support bar 530, so that the boss portion 525 has a larger outer diameter, and the boss portion 525 is higher than the upper portion 521 of the housing 520. Thus, in the housing 520, the flat portion 524 is provided to have a shape cut from an upper end of the boss portion 525 to the upper end portion 521 of the housing 520.

The support bar 530 is made of a resin (polyphenylene sulfide, polyether ether ketone, or the like). The support bar 530 is separately formed from the housing 520. AS shown in FIGS. 11A and 11B and 12A and 12B, the support bar 530 is provided at the peripheral wall of the housing 520 so as to extend in a radial direction of the housing 520. As shown in FIGS. 12A and 12B and 13A to 13C, the support bar 530 has a bar portion 531, a protruding ridge 532, a straight portion 533, a protruding portion 534, and a flange portion 535.

In consideration of a die for forming the housing 520 and the support bar 530, when the phase angle is 0 degrees or 180 degrees, the embodiment in which the housing 520 and the support bar 530 are separately formed is desirable.

The straight portion 533 is positioned so as not to be covered with the opening portion 525a of the boss portion 525 proximate to the leading end of the support bar 530. Specifically, the straight portion 533 is formed at a side of the housing 520 and within a predetermined range in an axial direction of the support bar 530 which is apart from the boss portion 525. The straight portion 533 has a columnar shape having an outer diameter equal to that of the circumscribed circle circumscribed on the protruding ridge 532.

The protruding portion 534 is positioned so as to be covered with the opening portion 525a of the boss portion 525 between the straight portion 533 and the flange portion 535. Specifically, the opening portion 525a is formed so as to closely contact and cover the entire periphery of the protruding portion 534. The protruding portion 534 is formed to have the same shape as that of protruding ridge 532 of the bar portion 531.

Since the protruding portion 534 is provided in this manner, when a torsional load is applied on the housing 520 or the support bar 530, rotation of the housing 520 or the support bar 530 with respect to each other is prevented. Thus, when a torsional load is applied on the housing 520 or the support bar 530, change of the phase angle between the housings 520 is prevented, and the function of the ball joint 10 can be maintained.

The flange portion 535 is provided at a leading end portion of the bar portion 531. The flange portion 535 is formed to be flanged. The entire periphery of the flange portion 535 is provided so as to be covered with the opening portion 525a. That is, the opening portion 525a is formed so as to closely contact and cover the entire periphery of the flange portion 535. When a tensile load is applied in the axial direction of the support bar 530, removal of the support bar 530 from the boss portion 525 of the housing 520 is prevented.

As shown in FIGS. 13A to 13C, when reference symbol Ab denotes a cross sectional area of the support bar 530 and reference symbol Dv denotes a root diameter between the protruding ridges 532 and 532, the thickness t of the flange portion 535 satisfies the following Equation 1.

$$t \geq Ab/Dv \qquad \text{Equation 1}$$

As shown in FIG. 13C, the area Af of the flange portion 535, which is other than an area of a circumscribed circle circumscribed on the flange portion 535, satisfies the following Equation 2.

$$Af \geq Ab \qquad \text{Equation 2}$$

The flange portion 535 is formed so as to satisfy the Equations 1 and 2, so that easy breakage of the flange portion 535 can be prevented, and removal of the support bar 530 from the boss portion 525 of the housing 520, which may be caused by a tensile load, can be prevented.

In this embodiment, in order that the flange portion 535 may not be larger than the size of the housing 520 of the axial direction of the ball stud 100, the flange portion 535 has an outer shape such that upper and lower ends of circular shape are cut. Alternatively, for example, when the Equation 2 is satisfied, the outer shape of the flange portion 535 is a circular shape or the like.

In this embodiment, since the housing 520 and the support bar 530 are mechanically engaged with each other, easy separation of the support bar 530 from the housing 520 can be prevented. Since the housing 520 and the support bar 530 are made of the same material, generation of backlash, crack, or the like, in which contact surfaces of the housing 520 and the support bar 530 may be separated from each other due to difference in thermal expansion coefficient, can be prevented. Thus, the reliability of the ball joint 10 can be improved.

Production Method for Pivot Member of Second Embodiment

Figure 14:
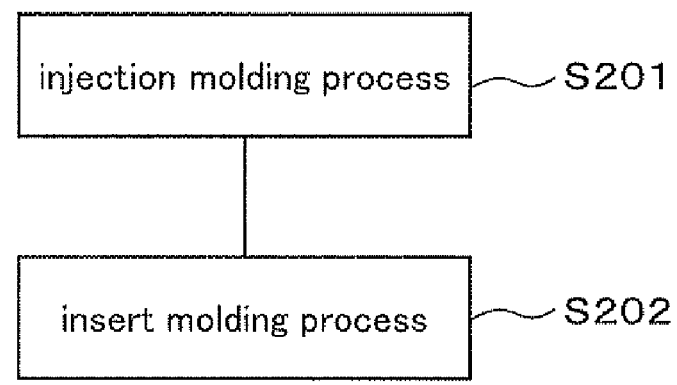
FIG. 14 is a flow chart which shows a production method for a pivot member.

Next, a production method for the pivot member of the second embodiment will be explained. FIG. 14 is a flow chart which shows a production method for the pivot member.

First, in an injection molding process (in step S201), the support bar 530, which has the straight portion 533, the flange portion 535, and the like, are formed by injection using a resin. Next, in a insert molding process (in step S202), the housing 520 is formed by injection using a resin such that the leading end portion of the support bar 530 is covered with the resin. In this insert molding process, first, the leading end portion of the support bar 530, which includes the protruding portion 534 and the flange portion 535, is inserted into a die. Next, the support bar 530 is supported by supporting the straight portion 533, and the housing 520 is formed by the resin such that the leading end portion of the support bar 530 is covered with the boss portion 525. The pivot member 500 is produced by the above processes.

In this production method, when the housing 520 is formed at the leading end portion of the support bar 530 after formation of the support bar 530, the support bar 530 is supported by supporting the straight portion 533, and the housing 520 can be formed. Thus, when the housing 520 is formed, the support bar 530 is easily supported, so that change of the relative position of the support bar 530 to the die for forming the housing 520 can be prevented. Therefore, leakage of the resin from the die for forming the housing 520 can be prevented.

The end portion of the support bar 530 can be strongly compressed and secured by molding shrinkage of the housing 520 formed after the formation of the support bar 530. Thus, generation of backlash, in which contact surfaces of the housing 520 and the support bar 530 may be separated from each other, can be prevented, so that the reliability of the ball joint 10 can be improved.

INDUSTRIAL APPLICABILITY

The present invention can be used for stabilizers, which are provided to vehicles (automobiles and the like), or the like.

The invention claimed is:

1. A ball joint comprising:
   a longitudinally extending support bar, said support bar comprising:
      a bar portion formed at a central portion of said support bar,
      a flange portion formed at a leading end portion of said support bar distal to said bar portion, said flange portion comprising a plurality of longitudinally extending protruding portions, said protruding portions projecting radially outward so as to form a plurality of circumferentially spaced ridges around said flange portion, and
      a columnar straight portion formed between said bar portion and said flange portion,
      wherein said bar portion, said straight portion, and said flange portion are of substantially the same outer diameter;
   a housing connected to said support bar, said housing being made of injection-molded resin and comprising:
      a ball seat made of resin and having a spherical recess portion for receiving a ball stud, and
      a boss portion formed adjacent said ball seat, said boss portion comprising an opening portion formed at a side surface of said housing,
      wherein said housing is formed by injecting resin in such a manner that said opening portion of said boss portion covers a periphery of said protruding portions of said flange portion; and
   a ball stud, said ball stud comprising:
      a columnar stud portion having a longitudinal axis extending therethrough, and
      a ball portion connected to said stud portion, said ball portion having a spherical side surface, with a center of said spherical side surface being aligned with said longitudinal axis of said stud portion,
      wherein said ball portion is rotatably and slidably fitted into said ball seat of said housing.

2. A ball joint according to claim 1, wherein the support bar has plural protruding ridges which are integrally formed with the bar portion in a circumferential direction of the support bar.

3. A ball joint according to claim 1, wherein the straight portion is formed at the side surface of the boss portion of the housing and extends in an axial direction of the support bar.

4. A ball joint according to claim 1, wherein the housing is formed to have an upper end side and a bottom side, the upper end side having an outer diameter larger than that of the bottom side.

5. A ball joint according to claim 1, wherein the ball joint further comprises:
   a dust cover which has a first end contacting the stud portion and a second end contacting an upper end of the housing;
   an upper end portion which is formed at the upper end of the housing so as to have a flat contact portion which the dust cover contacts when the ball stud vibrates; and
   a flat portion which is formed at a side of the support bar so as to be flush with the upper end portion.

* * * * *